United States Patent
Yamagata et al.

(10) Patent No.: US 10,213,829 B2
(45) Date of Patent: Feb. 26, 2019

(54) CYLINDER LINER AND METHOD FOR PRODUCING SAME

(71) Applicant: MORESCO CORPORATION, Kobe-shi, Hyogo (JP)

(72) Inventors: Hiroshi Yamagata, Gifu (JP); Hidetaka Shima, Kobe (JP)

(73) Assignee: MORESCO CORPORATION, Kobe-shi (JP)

( * ) Notice: Subject to any disclaimer, the term of this patent is extended or adjusted under 35 U.S.C. 154(b) by 0 days.

(21) Appl. No.: 15/203,997

(22) Filed: Jul. 7, 2016

(65) Prior Publication Data

US 2016/0332225 A1    Nov. 17, 2016

Related U.S. Application Data

(62) Division of application No. 13/579,603, filed as application No. PCT/JP2011/054759 on Mar. 2, 2011, now Pat. No. 9,427,801.

(30) Foreign Application Priority Data

Mar. 17, 2010   (JP) ................................. 2010-060795

(51) Int. Cl.
*B22D 15/02* (2006.01)
*B22D 19/00* (2006.01)
(Continued)

(52) U.S. Cl.
CPC ......... *B22D 19/0009* (2013.01); *B22D 15/02* (2013.01); *B22D 19/08* (2013.01);
(Continued)

(58) Field of Classification Search
CPC .... B22D 15/02; B22D 19/00; B22D 19/0009; B22D 19/08; B22D 29/00; B22D 33/04
(Continued)

(56) References Cited

U.S. PATENT DOCUMENTS

| 4,154,900 A | 5/1979 | Kaku et al. |
| 5,277,831 A * | 1/1994 | Hanano ..................... B22C 3/00 |
| | | 106/38.22 |

(Continued)

FOREIGN PATENT DOCUMENTS

| CN | 1310726 | 4/2007 |
| CN | 2900814 | 5/2007 |

(Continued)

OTHER PUBLICATIONS

Office Action dated Jun. 20, 2016 for corresponding KR patent application No. 10-2012-7026970, with translation.
(Continued)

*Primary Examiner* — Kevin P Kerns
(74) *Attorney, Agent, or Firm* — Kratz, Quintos & Hanson, LLP

(57) ABSTRACT

Disclosed is a cylinder liner having a high bonding strength to a cylinder block. Further disclosed is a method for producing the same. The cylinder liner uses a silicon-aluminum alloy as a material; a plurality of protrusions are formed on the external surface thereof; and the protrusions each contain a pillar section extending from the external surface, and a head section formed at the end of the pillar section.

11 Claims, 6 Drawing Sheets

(51) Int. Cl.
    *B22D 19/08*     (2006.01)
    *B22D 29/00*     (2006.01)
    *B22D 33/04*     (2006.01)
    *F02F 1/10*     (2006.01)
    *F16J 10/04*     (2006.01)
    *C23C 4/134*     (2016.01)
    *F02F 1/00*     (2006.01)

(52) U.S. Cl.
    CPC .............. *B22D 29/00* (2013.01); *C23C 4/134* (2016.01); *F02F 1/004* (2013.01); *F02F 1/102* (2013.01); *F16J 10/04* (2013.01); *F02F 2200/00* (2013.01)

(58) Field of Classification Search
    USPC ............................... 164/137, 14, 33, 72, 138
    See application file for complete search history.

(56) References Cited

U.S. PATENT DOCUMENTS

| | | |
|---|---|---|
| 6,286,210 B1 | 9/2001 | Ruckert |
| 9,427,801 B2 * | 8/2016 | Yamagata et al. ..... B22D 15/02 |
| 2003/0084567 A1 * | 5/2003 | Dickmann et al. ........ B21J 5/12 |
| | | 29/888.061 |
| 2005/0161187 A1 | 7/2005 | Kodama et al. |
| 2007/0209627 A1 | 9/2007 | Bing et al. |
| 2007/0240652 A1 | 10/2007 | Michioka |
| 2009/0272261 A1 | 11/2009 | Sato et al. |
| 2010/0031914 A1 | 2/2010 | Fukumoto et al. |
| 2010/0059012 A1 | 3/2010 | Tachibana et al. |
| 2011/0162521 A1 * | 7/2011 | Takami et al. ......... B22D 17/10 |
| | | 92/169.1 |

FOREIGN PATENT DOCUMENTS

| | | |
|---|---|---|
| CN | 101218048 | 7/2008 |
| CN | 101258318 | 9/2008 |
| CN | 101631631 | 1/2010 |
| EP | 2186582 A1 | 5/2010 |
| JP | 52-138017 | 11/1977 |
| JP | S63-248543 | 10/1988 |
| JP | H8-290255 | 11/1996 |
| JP | 2002-504435 A1 | 2/2002 |
| JP | 2003-326353 A1 | 11/2003 |
| JP | 2005-194983 A1 | 7/2005 |
| JP | 2009243386 A | 10/2009 |
| KR | 1020050009299 A | 1/2005 |
| KR | 1020090115052 A | 11/2009 |
| WO | 2007/007821 | 1/2007 |
| WO | 2007/007822 | 1/2007 |
| WO | 2008/059329 | 5/2008 |

OTHER PUBLICATIONS

International Search Report for International Application No. PCT/JP2011/054759 dated May 17, 2011.

* cited by examiner

[Fig. 1]
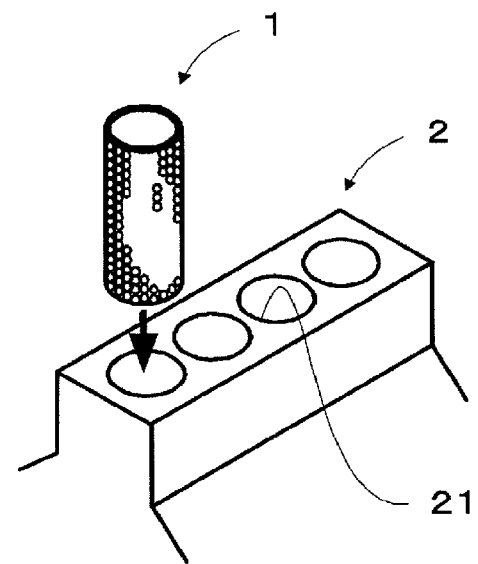
[Fig. 2]
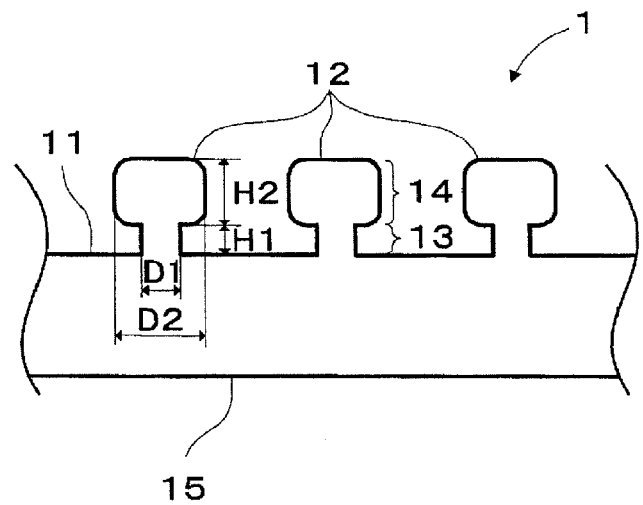

[Fig. 3]
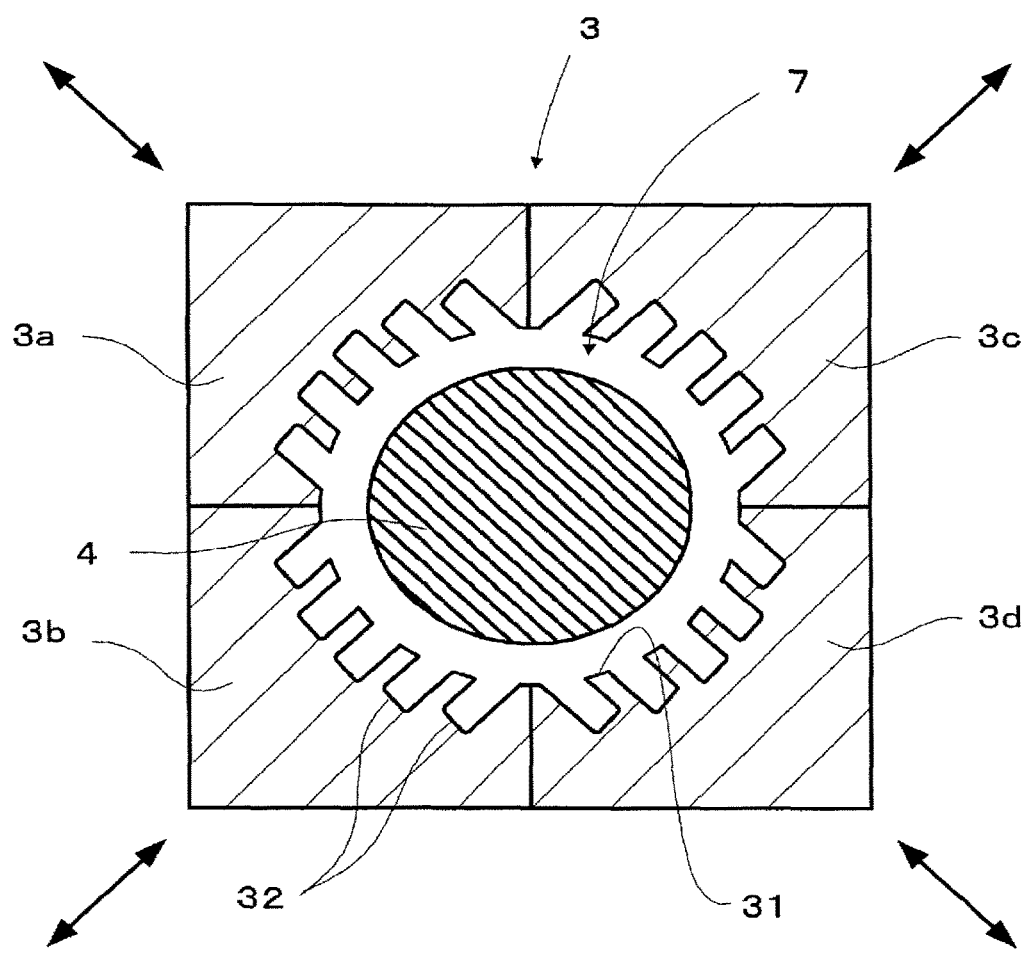

[Fig. 4]
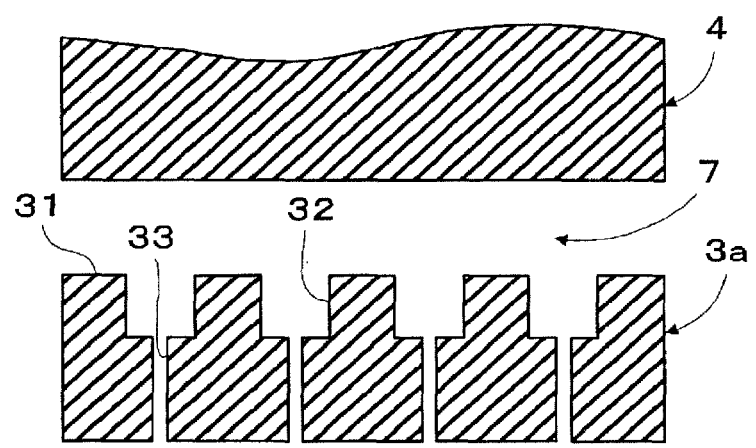

[Fig. 5]
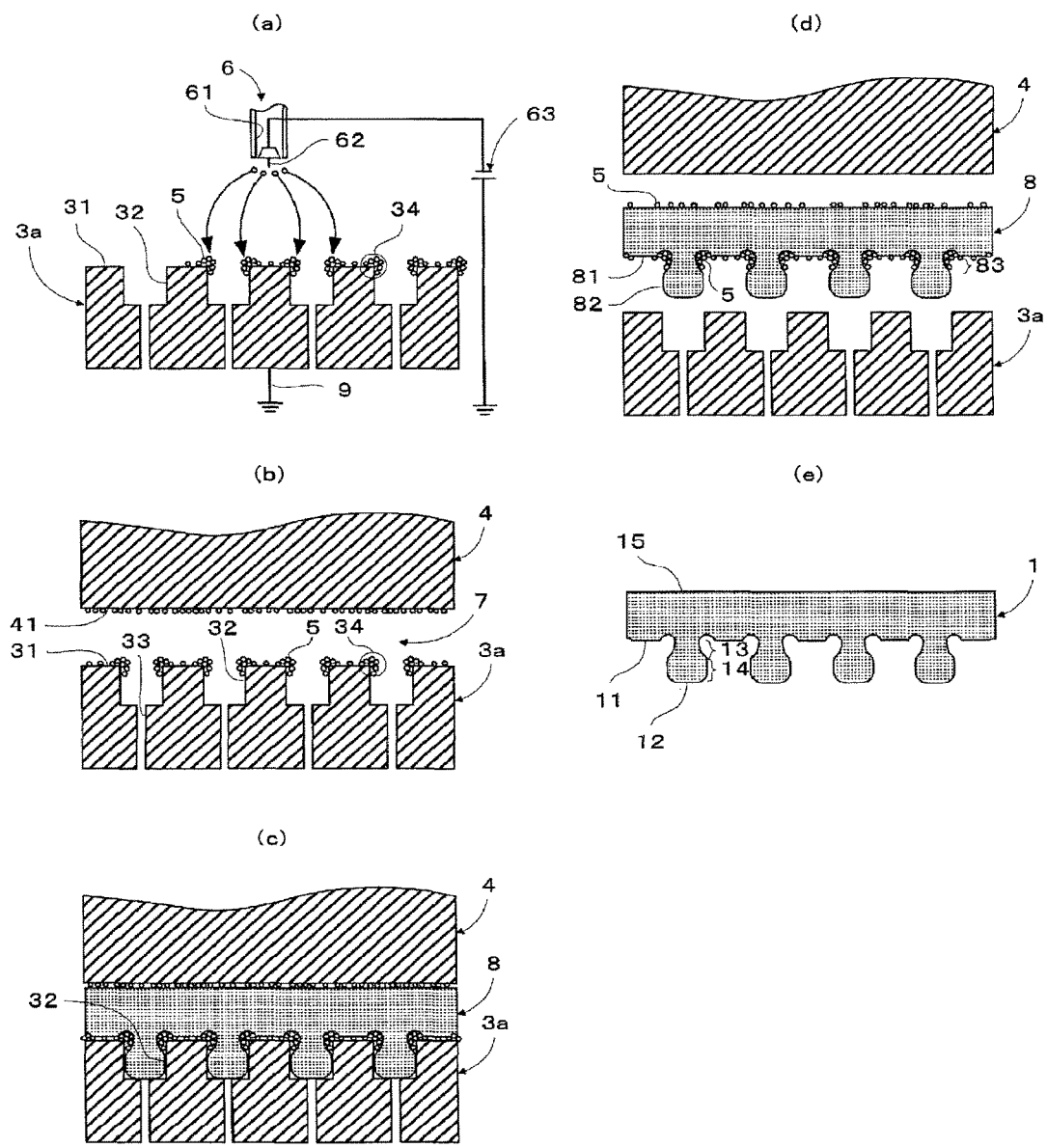

[Fig. 6]
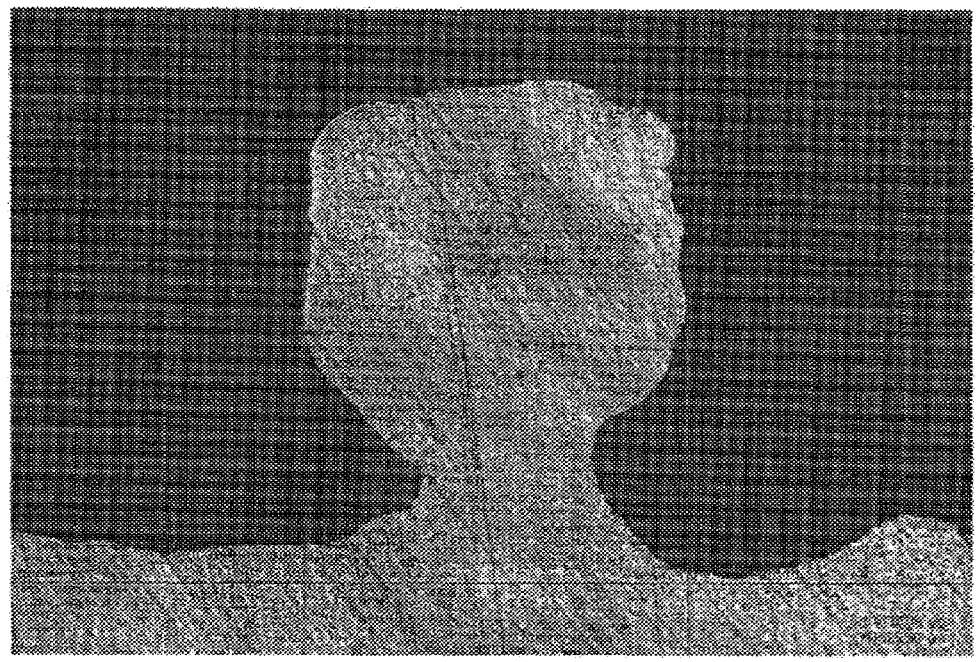

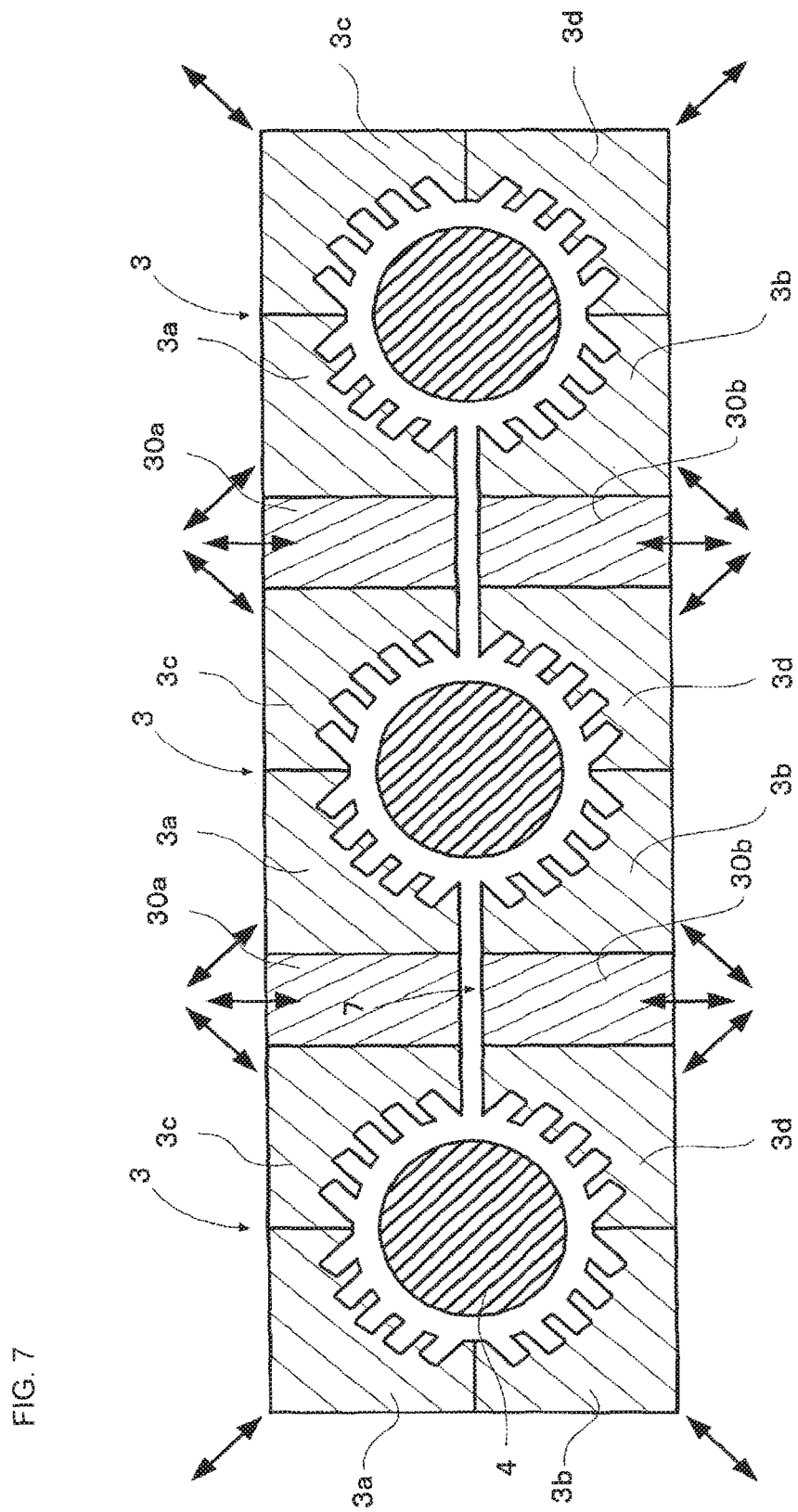

CYLINDER LINER AND METHOD FOR PRODUCING SAME

This application is a divisional application of U.S. application Ser. No. 13/579,603, filed Aug. 17, 2012, which issued on Aug. 30, 2016, as U.S. Pat. No. 9,427,801, which is a 371 application of International Application PCT/JP2011/054759, filed on Mar. 2, 2011, which claims benefit to Japanese Application 2010-060795, filed Mar. 17, 2010, the entire contents of which are incorporated herein by reference in their entireties.

TECHNICAL FIELD

The present invention relates to a cylinder liner and a method for producing the same.

BACKGROUND ART

A cylinder block for use in automobile engines and the like comprises a plurality of cylinder bores inside each of which a piston slides. Here, a problem arises such that the inner surfaces of the cylinder bores are abraded due to the sliding of the pistons. In order to solve this problem, a cylinder block in which abrasion resistance is secured by casting the entire cylinder block thereof from a high silicon-aluminum alloy such as A390 is proposed. However, a cylinder block formed of A390 is very hard, making it difficult to process after casting. To solve this problem, a cylinder block with cylinder liners provided in the cylinder bores is proposed (Patent Literature 1). This cylinder block has a structure wherein only the cylinder liners are formed of a high silicon-aluminum alloy, and the remainder thereof is formed of an aluminum alloy that does not contain silicon. Therefore, this cylinder block is advantageous in that it can achieve a high abrasion resistance on the piston-sliding surface, and, at the same time, is easily processed after casting.

CITATION LIST

Patent Literature

PTL 1: Japanese Unexamined Patent Publication No. 2002-504435

SUMMARY OF INVENTION

Technical Problem

The cylinder liner for the cylinder block described above comprises recessions and protrusions on the external surface and is fixed in the cylinder bores by being cast into an aluminum alloy. However, such a cylinder liner has a drawback in that it has insufficient bonding strength with the cylinder block.

An object of the present invention is to provide a cylinder liner having a high bonding strength with a cylinder block, and a production method for the same.

Solution to Problem

The present inventors conducted extensive research in order to achieve the above object and found that the bonding strength between a cylinder liner and a cylinder block depends on the shapes of the recessions and protrusions, in particular the protrusions of the external surface of the cylinder liner. The present invention has been accomplished based on this finding. More specifically, the cylinder liner of the present invention uses a silicon-aluminum alloy as the material, and comprises a plurality of protrusions formed on the external surface thereof, wherein each of the protrusions comprises a pillar section extending from the external surface, and a head section formed on the end of the pillar section.

In the cylinder liner, each of the protrusions on the external surface has a constricted portion formed by a head section and a pillar section. Therefore, if this cylinder liner is united with a cylinder block by inserting it in an aluminum alloy or like metal by employing low-pressure casting, die casting or the like, the cylinder liner and the cylinder block can be firmly united because the molten metal can securely enter the constricted portions of the protrusions. Note that the concept of the cylinder liner of the present invention includes not only those formed only of a silicon-aluminum alloy but also those formed of a material containing other components in addition to a silicon-aluminum alloy.

In the cylinder liner, the ratio of the distance from the external surface to the end surface of the head section to the distance from the external surface to the minimum diameter portion of the pillar section is preferably 2 to 80:1.

It is also possible to connect a plurality of the cylinder liners to form a cylinder liner-connected body.

The cylinder liner can be produced by, for example, using a mold comprising a plurality of slides having recessions formed in the internal surfaces thereof and a core. More specifically, a particulate mold release agent is adhered to the edge portions of the recessions in the slides, and a molten silicon-aluminum alloy is flowed into the cavity and the recessions under the condition described above, thereby casting a cylinder liner-intermediate. Protrusions are formed on the external surface of the cylinder liner-intermediate. A mold release agent enters the root portion of each protrusion. Thereafter, the cylinder liner-intermediate is taken out from the mold and the mold release agent adhered to the surface of the cylinder liner-intermediate is removed, obtaining a cylinder liner having protrusions with each of which root portion is constricted. In this specification, the term cavity refers to the space in which a cylinder liner-intermediate is molded.

In the above production method, the particulate mold release agent may be adhered to the edge portions of each recession of the mold, for example, by charging the mold release agent by a corona discharge. In this method, because a large amount of charged mold release agent adheres to the edge portions of each recession where the electrical lines of force concentrate, a large amount of mold release agent can be made to enter the root portions of protrusions of the cylinder liner-intermediate, forming a deep constriction at each root portion of protrusion of the cylinder liner-intermediate.

In the above production method, the external surface of the particulate mold release agent may be covered with a material containing an organic component. In this method, when the mold release agent is adhered to the edge portions of each recession, because the organic component on the external surface of the mold release agent melts due to the heat of the mold, the mold release agent can firmly adhere to the edge portions of each recession. Furthermore, because particles of mold release agent whose external surfaces are molten adhere to each other, the mold release agent can be laminated in the edge portions of the recession. This allows a larger amount of the mold release agent to enter the root portion of each protrusion of the cylinder liner-intermediate, forming a deep constriction in the root portion of the protrusion of the cylinder liner-intermediate.

In the above production method, air in the cavity may be discharged from outlets each formed in the bottom of each recession in the slide. More preferably, air in the cavity is actively removed by suction through the outlets. According to this method, the cavity can be decompressed by discharging air therefrom; therefore, the silicon-aluminum alloy can be effectively flown into the recessions. This allows the protrusions of the cylinder liner to be formed in a reliable manner.

In the above production method, each cavity delimited by the mold may have a form such that two or more tubes are connected. This makes it possible to produce a cylinder liner-connected body applicable to a cylinder block for a multiple-cylinder engine. As a result, production time can be reduced and advantages can be gained in terms of production cost.

It is also possible to produce a cylinder liner by using a production apparatus comprising the mold as described above, and an adhering means for adhering a mold release agent to the edge portions of recessions.

In the above production apparatus, the adhering means may be such that the mold release agent is electrically charged by a corona discharge.

The production apparatus may further comprise a means for casting a cylinder liner-intermediate using a molten silicon-aluminum alloy; a means for releasing the cylinder liner-intermediate that was formed by the casting means from the mold; a means for removing the mold release agent from the cylinder liner-intermediate; etc. Examples of the casting means include gravity casting, low-pressure casting, die casting and the like. The means for releasing the cylinder liner-intermediate may be such that the slides are shifted to release the cylinder liner-intermediate, or when a core is used, the cylinder liner-intermediate or the core may be pulled or pushed out. Examples of the removing means include the use of a brush, immersion in a solvent that can dissolve the organic component, ultrasonic cleaning, etc.

Advantageous Effects of Invention

The present invention can increase the bonding strength between the cylinder liner and the cylinder block.

BRIEF DESCRIPTION OF DRAWINGS

FIG. 1 is a perspective view schematically illustrating the cylinder liner and cylinder block according to the embodiment described above.

FIG. 2 is a partial front sectional view of the cylinder liner according to the embodiment described above.

FIG. 3 is a plan view schematically illustrating the mold and core according to the embodiment described above.

FIG. 4 is a partial front sectional view schematically illustrating the mold according to the embodiment described above.

FIG. 5 is a partial front sectional view schematically illustrating the method for producing a cylinder liner according to the embodiment described above.

FIG. 6 is a cross-sectional photograph showing a part of the cylinder liner according to the embodiment described above.

FIG. 7 is a plan view schematically illustrating the mold and core according to a modified example of the embodiment described above.

DESCRIPTION OF EMBODIMENTS

One embodiment of the cylinder liner of the present invention, a production apparatus thereof and a production method thereof are explained in detail below with reference to the attached drawings.

First, the cylinder liner 1 according to the present embodiment is explained below.

As shown in FIG. 1, a cylinder liner 1 is used by being inserted in a cylinder bore 21 of a cylinder block 2. The cylinder liner 1 is made of a silicon-aluminum alloy, and comprises a plurality of protrusions 12 on the external surface thereof as shown in FIG. 2. The protrusion 12 comprises a pillar section 13 and a head section 14 whose diameter is larger than that of the pillar section 13. Note that, in the protrusion 12 of the cylinder liner 1, the difference between the diameter D1 of the pillar section 13 and the diameter D2 of the head section 14 is preferably 2 μm or more, wherein D1 is preferably 300 μm or more and D2 is preferably 302 μm or more. The height H1 of the pillar section 13 is preferably 50 to 1,000 μm, the height H2 of the head section 14 is preferably 50 to 2,000 μm, and the ratio of H1 to H2 is preferably 1:1 to 40 (H1:H2=1:1-40), more preferably H1:H2=1:1 provided that H1≤H2. FIG. 6 shows one example of the shape of the protrusion formed on the external surface of the cylinder liner.

The apparatus for producing the cylinder liner 1 described above is explained below.

As shown in FIGS. 3 to 5, the production apparatus is provided with a mold 3 and an adhering means 6 for adhering a particulate mold release agent 5 to the mold 3.

As shown in FIG. 3, the mold 3 delimits the cavity 7, and the cavity 7 is used for casting a cylinder liner-intermediate 8 described below. The mold 3 is composed of a first to fourth slides 3a to 3d that are openable/closeable in the diagonal direction (in the direction shown by the arrows in FIG. 3) and a core 4. A plurality of recessions 32 are formed on the inner surface 31 in each of the first to fourth slides 3a to 3d. The recessions 32 are to form protrusions 82 on the external surface of the cylinder liner-intermediate 8, and extend along the diagonal direction of the first to fourth slides 3a to 3d. As shown in FIG. 4, an outlet 33 for discharging air from the cavity 7 is formed in the bottom of each recession 32. The core 4 is made of metal and located in the center of the first to fourth slides 3a to 3d in order to die cast the cylinder liner-intermediate 8.

As shown in FIG. 5(*a*), the adhering means 6 is designed so as to spray or blow the particulate mold release agent 5 onto the first to fourth slides 3a to 3d and the core 4 by passing it through the passage 61 along the airflow. The adhering means 6 also electrifies the mold release agent 5 by means of the needle electrode 62 provided on the tip of the passage 61 and an external power source 63 located outside of the passage 61. More specifically, electric power from the external power source 63 is supplied to a high-voltage generator (not shown) to generate a high voltage, and the high voltage thus generated is applied to the needle electrode 62. This generates a corona discharge to form corona ions around the needle electrode 62. Due to the adhesion of the corona ions to the mold release agent 5 that passed through the passage 61, the mold release agent 5 becomes charged. Examples of the adhering means 6 include commercially available corona powder coating guns such as the MATSUO X-1a (manufactured by Matsuo Industry Corporation).

The mold release agent 5 preferably has a particle diameter of 1 to 100 μm, and more preferably 5 to 50 μm. Furthermore, the mold release agent 5 preferably has a structure wherein the central portion thereof is formed of a material containing an inorganic component, and the external surface thereof is covered with a material containing an organic component. Examples of the organic component include polytetrafluoroethylene, polyvinyl chloride, polyethylene, polypropylene, carnauba wax, acrylic resin, epoxy resin, polystyrene, polyurethane, nylon 6, nylon 66, nylon 11, nylon 12, cellulose, fatty acid, higher alcohol, metal soap, fatty acid amide, fatty acid ester, alkali salt of fatty acid and the like. Examples of the inorganic component include talc, mica, black lead, diamond, molybdenum disulfide, boron nitride, alumina, silica, titania, zinc oxide, iron oxide, diatomaceous earth, zeolite and the like. The mold release agent 5 used in the present embodiment is obtained by coating the surface of Nano Tek® SiO2 (a commercially available material manufactured by C.I. Kasei Co., Ltd.) with Alflow® H-50TF (manufactured by NOF Corporation).

The method for producing a cylinder liner using the production apparatus described above is explained below with reference to mainly FIG. 5. Note that FIG. 5 illustrates only the first slide 3a; however, the second to fourth slides 3b to 3d follow the same procedure as the first slide 3a.

First, as shown in FIG. 5(a), the first slide 3a is heated and grounded using a ground wire 9. The temperature of the first slide 3a is preferably higher than the melting point or softening point of the organic component coating the mold release agent 5, and is specifically 100 to 300° C. Subsequently, with the mold 3 open, a high voltage is applied to the needle electrode 62 by the adhering means 6 to electrify the particulate mold release agent 5, and the electrified mold release agent 5 is sprayed toward the internal surface 31 of the first slide 3a. Here, the electrified mold release agent 5 adheres to the entire internal surface 31 except for the inside of the recessions 32. In particular, a large amount of the electrified mold release agent 5 adheres to the edge portions 34 of the recessions 32 to which electrical lines of force concentrate. Thereafter, while maintaining the core 4 at room temperature (25° C.), the mold release agent 5 is also adhered to the external surface 41 of the core 4 by the adhering means 6 (FIG. 5(b)). The mold release agent 5 is preferably adhered to the first to fourth slides 3a to 3d and core 4 each time that casting is performed. The voltage applied to the needle electrode 62 is preferably 20 to 100 kV. The air pressure when the mold release agent 5 is sprayed onto the first slide 3a and core 4 is not particularly limited and may be suitably selected within a range that is sufficient to allow the mold release agent 5 to reach the first slide 3a and to be sufficiently electrified when the mold release agent 5 passes near the needle electrode 62. Specifically, the air pressure is 0.01 to 0.5 MPa.

After reducing the pressure in the cavity 7 by sucking the air from the cavity 7 via outlets 33 of the first slide 3a, a cylinder liner-intermediate 8 is cast in the cavity 7 using a molten silicon-aluminum alloy by gravity casting, low-pressure casting, die casting, or the like (FIG. 5(c)). Because the pressure of the cavity 7 is reduced, the silicon-aluminum alloy is reliably flowed also into the recessions 32. The temperature of the silicon-aluminum alloy is preferably 700 to 800° C. The silicon-aluminum alloy has a silicon content of preferably 13 to 23% and more preferably 14 to 18%. In the present embodiment, high silicon-aluminum alloy A390 is used.

Subsequently, the first to fourth slides 3a to 3d are opened in diagonal directions (the directions shown by the arrows in FIG. 3), and the cylinder liner-intermediate 8 is pulled in the axial direction to take out the cylinder liner-intermediate 8 from the first to fourth slides 3a to 3d and core 4. The mold release agent 5 is adhered to the entire surface of the cylinder liner-intermediate 8 taken out, and a particularly large amount of the mold release agent 5 penetrates into the root portions 83 of the protrusions 82 formed on the external surface 81 (FIG. 5(d)).

Next, the mold release agent 5 is removed from the surface of the cylinder liner-intermediate 8 by using a brush. The cylinder liner-intermediate 8 is then immersed in a paraffin-based mineral oil (solvent) to dissolve the organic component on the external surface of the mold release agent 5. After applying ultrasonic cleaning to the cylinder liner-intermediate 8, the cylinder liner-intermediate 8 is washed with petroleum ether. This allows the mold release agent 5 that adhered to the entire surface of the cylinder liner-intermediate 8 and the mold release agent 5 that penetrated into the root portions 83 of the cylinder liner-intermediate 8 to be removed, obtaining a cylinder liner 1 comprising protrusions 12 formed on its external surface 11. Here, each protrusion 12 is composed of a pillar section 13 and a head section 14, wherein the pillar section 13 has a diameter smaller than that of the head section 14 (FIG. 5(e)). The cylinder liner 1 thus produced is placed into a die for a cylinder block (not shown). By casting it in a molten aluminum alloy by means of low-pressure casting or die casting, a cylinder block 2 having cylinder bores 21 into each of which a cylinder liner 1 is fixed is formed (FIG. 1). Thereafter, the internal surface of the cylinder liner 1 is subjected to a boring process, honing, and edging to obtain a finished product.

As described above, the cylinder liner 1 according to the present embodiment is structured so that it comprises protrusions 12 formed on the external surface 11, wherein the diameter D1 of the pillar section 13 is smaller than the diameter D2 of the head section 14 so that the root portion of each protrusion 12 becomes constricted. Therefore, when a silicon-aluminum alloy is welded to the cylinder liner 1 to unify the cylinder liner 1 with the cylinder block 2, the silicon-aluminum alloy effectively enters the constricted portion of each protrusion 12, so that the cylinder liner 1 and the cylinder block 2 can be securely united to each other. As a result, machining can be applied to the inner surface of the cylinder liner 1 without shifting, finishing to a highly precise inner surface. This also improves the performance of the engine in actual operation. Furthermore, in the present embodiment, by electrifying the mold release agent 5 by a corona discharge, a particularly large amount of the mold release agent 5 can be adhered to edge portions 34 of recessions 32 of the mold 3. This makes it possible to cast a cylinder liner-intermediate 8 having a larger amount of the mold release agent 5 penetrated into the root portion 83 of each protrusion 82 and to form a deep constriction at the root portion of each protrusion 82 of the cylinder liner 1. Furthermore, in the present embodiment, because the silicon-aluminum alloy is flowed into the cavity 7 while keeping the core 4 at room temperature, the silicon-aluminum alloy is rapidly cooled inner side the cavity 7 by the core 4, and a large amount of silicon crystal particles can be deposited. This causes many silicon crystal particles to exist on the internal surface 15 of the cylinder liner 1, reliably obtaining a high abrasion resistance.

One embodiment of the present invention is explained above; however, the scope of the present invention is not limited to this, and various modifications may be made as long as they do not depart from the intention of the present invention. For example, in the above embodiment, the mold release agent 5 is adhered to the entire internal surface of the mold 3; however, all that's necessary is that the mold release agent is adhered at least to the edge portions of recessions, and, for example, the mold release agent may be adhered to a portion other than the edge portions in a striped pattern. Note that it is preferable that the mold release agent be adhered to the internal surface (excluding the recessions) of the mold so as to prevent the silicon-aluminum alloy from solidifying before flowing into the recessions.

In the above embodiment, the mold release agent 5 is electrified by a corona discharge to adhere it to the mold 3 and core 4. However, as long as the mold release agent can be adhered at least to the edge portions of recessions, the method is not limited to the above, and, for example, the mold release agent may be simply applied to the mold without electrifying.

In the above embodiment, only the root portion is constricted in each protrusion 12 of the cylinder liner 1; however, the structure thereof is not limited to this as long as the root portion of each protrusion can be made constricted, and, for example, at least one or more constrictions may be formed in the head section of the protrusion.

Furthermore, in the above embodiment, the head section 14 of the protrusion 12 has a pillar-like shape with an almost uniform diameter. However, the shape of the head section 14 is not limited to this and may be formed into various shapes such as spherical, conical, pyramidal and the like.

In the above embodiment, the mold release agent 5 is removed from the cylinder liner-intermediate 8, after removing the mold release agent 5 that has adhered to the surface of the cylinder liner-intermediate 8 by using a brush, by immersing the cylinder liner-intermediate 8 in a solvent to dissolve the external surface of the mold release agent 5, and further performing ultrasonic cleaning. However, any method can be employed as long as the mold release agent can be removed from the cylinder liner-intermediate. For example, the mold release agent may be removed by at least one means selected from removal using a brush, immersion in a solvent, and performing ultrasonic cleaning. When the mold release agent 5 is removed by only immersion in a solvent, the external surface of the mold release agent 5 is preferably covered with an organic component.

In the above embodiment, a paraffin-based mineral oil is used as a solvent. However, the solvent is not limited to this as long as it can dissolve or disperse the organic component, and, for example, an aromatic solvent, water, a mixture of water and surfactant, an acid or alkali aqueous solution and the like may be used.

In the above embodiment, the cylinder liner is produced using a mold 3 comprising the first to fourth slides 3a to 3d. However, the mold is not limited to this as long as a cylinder liner-intermediate having protrusions on the external surface can be taken out, and a 6 or 8-piece split mold may be used.

In the above embodiment, the core 4 is maintained at room temperature; however, the temperature of the core 4 is not limited to this as long as it is lower than that of the plurality of slides.

In the above embodiment, the core 4 is metallic; however, the material for the core 4 is not limited to metal as long as it can die cast the center of the cylinder liner-intermediate, and the core 4 may be made of sand, ceramics and the like. Even when a core made of sand or ceramics is used, when its temperature is maintained lower than that of the plurality of slides, many silicon crystal particles can be formed inside the cylinder liner.

In the above embodiment, air in the cavity 7 is sucked through the outlets 33 of the mold 3; however, possible embodiments are not limited to this, and the air in the cavity 7 is not necessarily sucked out. In this case, the pressure of the cavity can be reduced by naturally releasing the air through the outlets.

Furthermore, a single cylinder liner 1 is produced in the above embodiment; however, possible embodiments are not limited to this, and a cylinder liner-connected body in which a plurality of cylinder liners are connected may be produced. In this case, for example, as shown in FIG. 7, a cylinder liner-connected body can be produced by aligning a plurality of sets of mold 3 that are similar to that used in the above embodiment, and arranging fifth and sixth slides 30a, 30b between the molds.

The plurality of protrusions formed on the cylinder liner do not necessarily have to have the same shape as that in the embodiment described above as long as a strong adhesion between the cylinder liner and the cylinder block can be secured. The protrusions may include, for example, those having no constricted portion; those having a ratio of other than 2 to 80:1 for the distance from the cylinder liner external surface to the end surface of the head section to the distance from the cylinder liner external surface to the minimum diameter portion of the pillar section; etc.

EXPLANATION OF NUMERICAL SYMBOLS 1 cylinder liner
2 cylinder block
12 protrusion
13 pillar section
14 head section
3 mold
3a-3d first to fourth slides (a plurality of slides)
32 recession
34 edge portion
33 outlet
4 core
5 mold release agent
6 adhering means
7 cavity
8 cylinder liner-intermediate

The invention claimed is:

1. A method for producing a cylinder liner comprising a plurality of protrusions on an external surface thereof, each of the plurality of protrusions comprising a constriction at a root portion thereof:
    preparing a mold having a plurality of slides and a core for delimitating a cavity, each of the plurality of slides having a surface facing the cavity and having recessions formed on the surface, wherein each slide is movable along a direction in which the recessions on the slides extend;
    adhering a particulate mold release agent to edge portions of the recessions such that a large amount of the mold release agent adheres to the edge portions in order to form the constriction at each protrusion;
    casting a cylinder liner-intermediate by flowing a silicon-aluminum alloy into the cavity and the recessions;
    taking the cylinder liner-intermediate out from the mold; and
    removing the mold release agent from the cylinder liner-intermediate.

2. The method according to claim 1, wherein the mold release agent is electrified by a corona discharge.

3. The method according to claim 2, wherein the external surface of the mold release agent is covered with a material containing an organic component.

4. The method according to claim 2, wherein the cavity has a shape in which a plurality of tubes are interlinked.

5. The method according to claim 2, wherein air in the cavity is discharged from an outlet formed in a bottom of each recession formed in the plurality of slides.

6. The method according to claim 1, wherein an external surface of the mold release agent is covered with a material containing an organic component.

7. The method according to claim 6, wherein the cavity has a shape in which a plurality of tubes are interlinked.

8. The method according to claim 6, wherein air in the cavity is discharged from an outlet formed in a bottom of each recession formed in the plurality of slides.

9. The method according to claim 1, wherein the cavity has a shape in which a plurality of tubes are interlinked.

10. The method according to claim 9, wherein air in the cavity is discharged from an outlet formed in a bottom of each recession formed in the plurality of slides.

11. The method according to claim 1, wherein each recession has a bottom and air in the cavity is discharged from an outlet formed in the bottom of each recession formed in the plurality of slides.

\* \* \* \* \*